United States Patent
Murphy-Chutorian et al.

(10) Patent No.: US 12,307,608 B2
(45) Date of Patent: May 20, 2025

(54) EFFICIENT GPU/CPU PIPELINE FOR PROVIDING AUGMENTED REALITY CONTENT

(71) Applicant: Niantic, Inc., San Francisco, CA (US)

(72) Inventors: Erik Murphy-Chutorian, Palo Alto, CA (US); Nicholas Butko, Cupertino, CA (US); Rigel Gareth Benton, Mountain View, CA (US); Dat Chu, San Francisco, CA (US); Scott Pollack, San Francisco, CA (US); Alvin Portillo, San Francisco, CA (US)

(73) Assignee: Niantic, Inc., San Francisco, CA (US)

( * ) Notice: Subject to any disclaimer, the term of this patent is extended or adjusted under 35 U.S.C. 154(b) by 21 days.

(21) Appl. No.: 17/982,501

(22) Filed: Nov. 7, 2022

(65) Prior Publication Data

US 2023/0206565 A1    Jun. 29, 2023

Related U.S. Application Data

(63) Continuation of application No. 16/124,124, filed on Sep. 6, 2018, now Pat. No. 11,494,987.

(51) Int. Cl.
*G06T 19/00* (2011.01)
*G06T 7/246* (2017.01)
*G06T 15/00* (2011.01)

(52) U.S. Cl.
CPC ............ *G06T 19/006* (2013.01); *G06T 7/246* (2017.01); *G06T 15/005* (2013.01)

(58) Field of Classification Search
None
See application file for complete search history.

(56) References Cited

U.S. PATENT DOCUMENTS

| | | | |
|---|---|---|---|
| 6,636,214 B1 * | 10/2003 | Leather | G06T 15/40 345/506 |
| 2013/0187947 A1 | 7/2013 | Barringer et al. | |
| 2013/0245429 A1 * | 9/2013 | Zhang | A61B 6/485 600/424 |
| 2015/0178939 A1 | 6/2015 | Bradski et al. | |
| 2017/0243352 A1 | 8/2017 | Kutliroff et al. | |
| 2017/0243403 A1 | 8/2017 | Daniels et al. | |
| 2018/0047332 A1 * | 2/2018 | Kuwahara | G06F 3/012 |

(Continued)

OTHER PUBLICATIONS

Göttl, F. et al. "Efficient Pose Tracking from Natural Features in Standard Web Browsers." Proceedings of the 23rd International ACM Conference on 3D Web Technology, arXiv:1804.08424v1, Apr. 23, 2018, pp. 1-4.

(Continued)

*Primary Examiner* — Ryan McCulley
(74) *Attorney, Agent, or Firm* — Fenwick & West LLP

(57) ABSTRACT

Implementations generally relate to providing augmented reality in a web browser. In one implementation, a method includes capturing images of a physical scene with a camera of a device. The method further includes determining motion of the camera using six degrees of freedom (6DoF) markerless tracking. The method further includes overlaying virtual three-dimensional (3D) content onto a depicted physical scene in the images, resulting in augmented reality (AR) images. The method further includes rendering the AR images in a browser of the device.

20 Claims, 13 Drawing Sheets

(56) References Cited

U.S. PATENT DOCUMENTS

| | | | |
|---|---|---|---|
| 2018/0114372 A1 | 4/2018 | Nagy et al. | |
| 2018/0262713 A1* | 9/2018 | Huang | G06T 15/20 |
| 2018/0293802 A1 | 10/2018 | Hendricks et al. | |
| 2018/0365871 A1* | 12/2018 | Nahman | G06F 16/9577 |
| 2019/0005602 A1 | 1/2019 | Storey et al. | |
| 2019/0088027 A1 | 3/2019 | Viseh | |

OTHER PUBLICATIONS

Lima, J., et al. "Markerless Tracking Solutions for Augmented Reality on the Web." Proc. of IEEE Symposium on Virtual and Augmented Reality. 2010, pp. 1-8.

Millikin, K., "A New Crankshaft for VS," Dec. 7, 2010, 4 pages, [Online] [Retrieved on Mar. 10, 2023] Retrieved from the Internet <URL:https://blog.chromium.org/2010/12/new-crankshaft-for-v8.html>.

Rister, B. et al. "A Fast and Efficient Sift Detector Using the Mobile GPU." 2013 IEEE International Conference on Acoustics, Speech and Signal Processing, May 2013 pp. 2674-2678.

Schechter, S. "The Ultimate Guide to Markerless Augmented Reality?" AR Bites, May 9, 2014, 20 pages, [Online] Retrieved from the Internet <URL:www.marxentlabs.com/what-is-markerless-augmented-reality-dead-reckoning/>.

Taheri, S. et al., "Computer Vision for the Masses: Bringing Computer Vision to the Open Web Platform*," EETimes, May 31, 2018, 14 pages, [Online] Retrieved from the Internet <URL: https://www.eetimes.com/computer-vision-for-the-masses-bringing-computer-vision-to-the-open-web-platform/>.

Zandaqo, M. D., "JavaScript. C++: Modern Ways to Use C++ in JavaScript Projects," Sep. 17, 2017, 5 pages, [Online] [Retrieved on Mar. 10, 2023] Retrieved from the Internet <URL:https://medium.com/netscape/javascript-c-modern-ways-to-use-c-in-javascript-projects-a19003c5a9ff/>.

United States Patent Office, U.S. Appl. No. 16/124,124, filed Jan. 26, 2022, 14 pages.

United States Patent Office, U.S. Appl. No. 16/124,124, filed Jul. 2, 2021, 12 pages.

United States Patent Office, U.S. Appl. No. 16/124,124, filed Dec. 1, 2020, 11 pages.

United States Patent Office, U.S. Appl. No. 16/124,124, filed Apr. 6, 2020, 13 pages.

United States Patent Office, U.S. Appl. No. 16/124,124, filed Nov. 6, 2019, 11 pages.

\* cited by examiner

6DoF Markerless Tracking

700

800

EFFICIENT GPU/CPU PIPELINE FOR PROVIDING AUGMENTED REALITY CONTENT

CROSS REFERENCE TO RELATED APPLICATIONS

The application is a continuation of U.S. Nonprovisional application Ser. No. 16/124,124, filed Sep. 6, 2018, which is incorporated by reference in its entirety.

BACKGROUND

Augmented reality is an interactive experience where a system augments objects in the real-world environment with computer-generated objects. AR technology may be provided using technologies such as simultaneous localization and mapping, which is a technique for building and updating a map of an environment while tracking a location in the environment. AR is typically implemented in native applications in order to perform at adequate speeds. There is some effort to provide web-based AR but such technologies are limited in function, too slow in their execution, and require specialized browsers.

SUMMARY

Implementations generally relate to providing augmented reality in a web browser. In one implementation, a method includes capturing images of a physical scene with a camera of a device. The method further includes determining motion of the camera using six degrees of freedom markerless tracking. The method further includes overlaying virtual three-dimensional content onto a depicted physical scene in the images, resulting in augmented reality images. The method further includes rendering the AR images in a browser of the device.

Other aspects and advantages of the described implementations will become apparent from the following detailed description, taken in conjunction with the accompanying drawings, illustrating by way of example, the principles of the described implementations.

DETAILED DESCRIPTION

Implementations generally relate to providing augmented reality (AR) in a web browser. More specifically, a system utilizes various web technologies to achieve simultaneous localization and mapping (SLAM) and six degrees of freedom (6DoF) markerless tracking. The system uses these techniques to execute an AR web application in a web browser. Implementations achieve AR in the web browser without need to customize the browser, and without the need to install a native application. Implementations enable the AR web application to work with existing web standards to provide fast AR in current and future web browsers.

As described in more detail below, in various implementations, a system captures images of a physical scene with a camera of a device. The system then determines feature points from the images. The system also tracks the feature points in the images using 6DoF markerless tracking. The system then overlays virtual three-dimensional (3D) content onto the physical scene in the images resulting in AR images. The system then renders the AR images in a browser of the user device.

Figure 1:
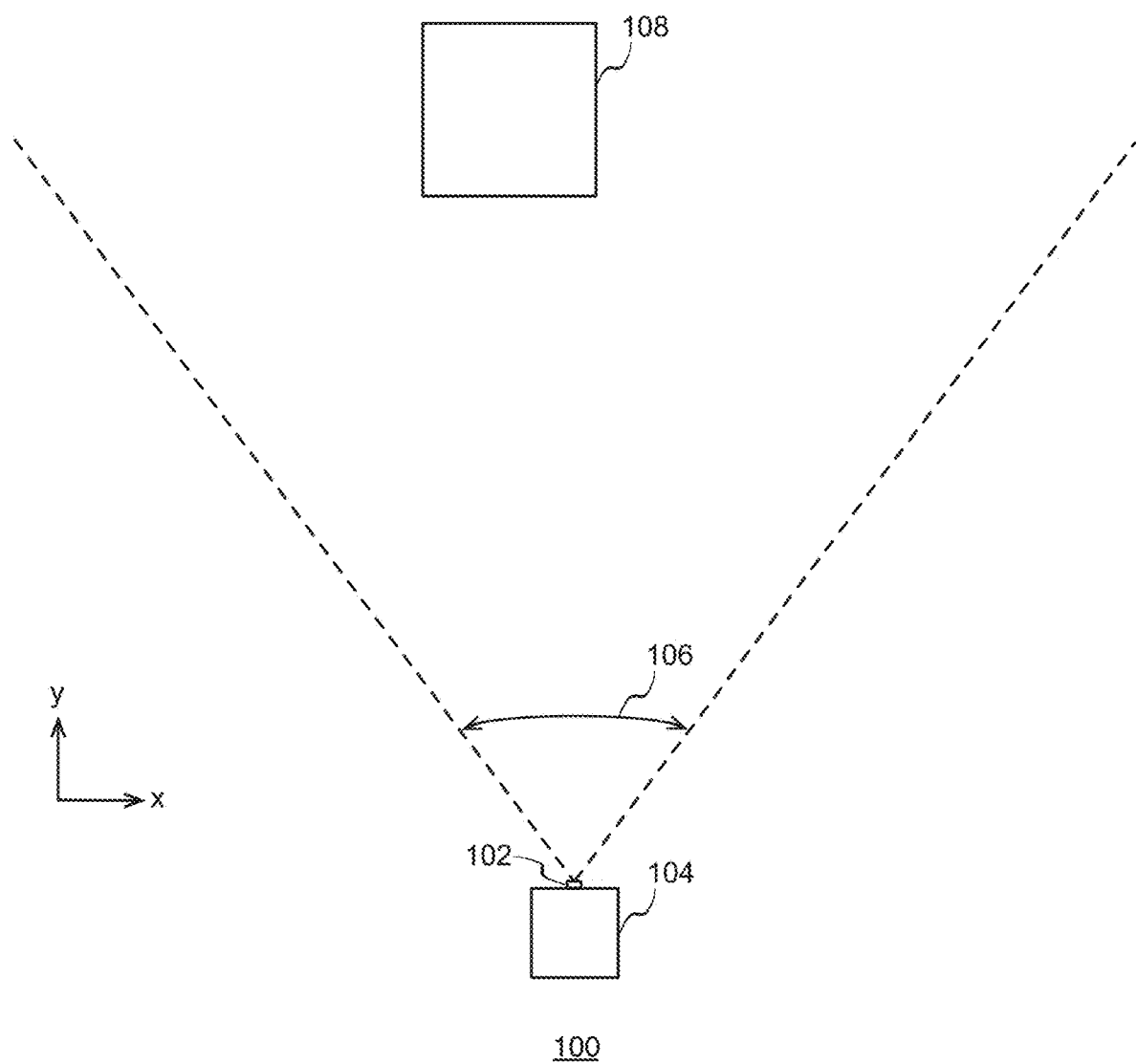
FIG. 1 illustrates a top-view diagram of an example physical environment, including a camera in a first position relative to an example object, according to some implementations.
Figure 2:
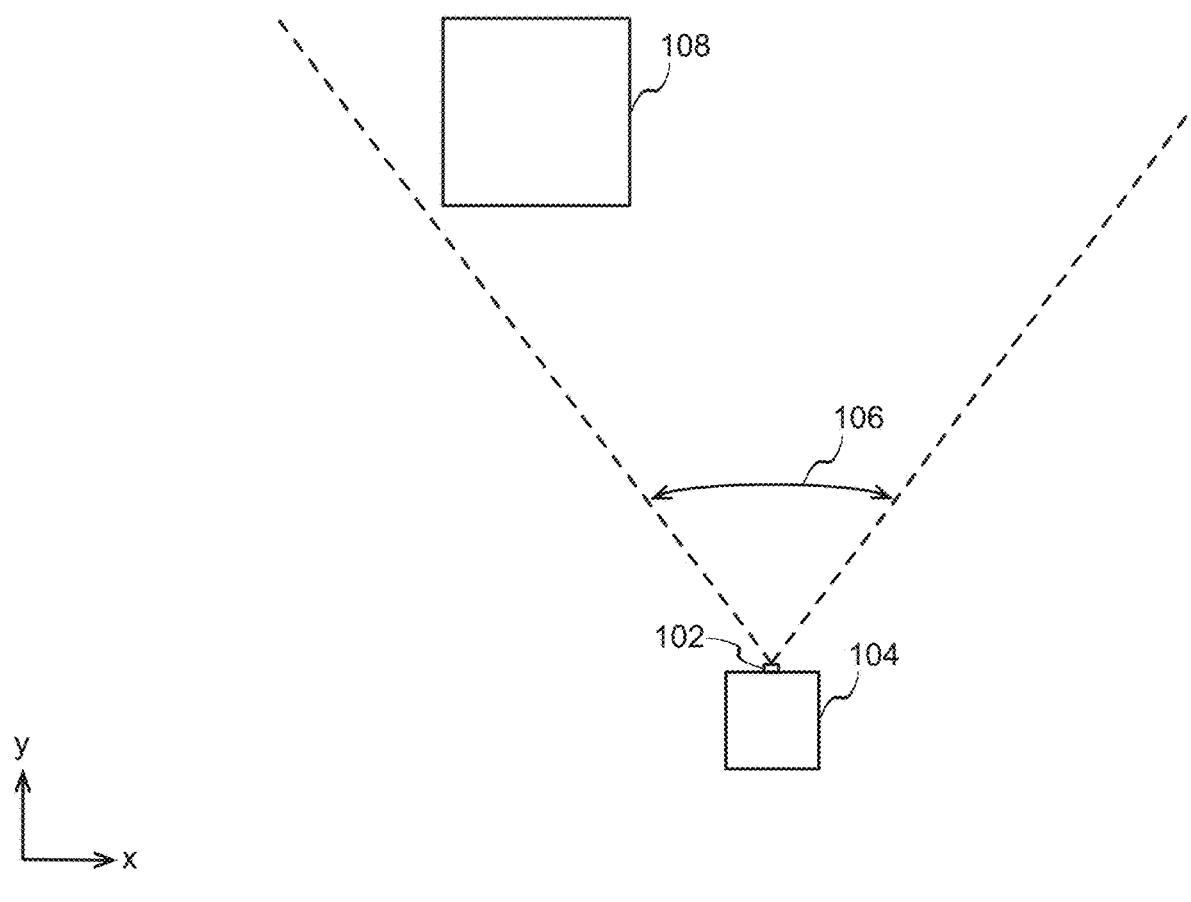
FIG. 2 illustrates a top-view diagram of the example physical environment, including the camera in a second position relative to the example object, according to some implementations.

FIGS. 1 and 2 show top views of a camera in an example physical environment, where the camera moves relative to the example object in the same physical environment.

FIG. 1 illustrates a top-view diagram of an example physical environment 100, including a camera 102 in a first position relative to an example object 108, according to some implementations. As shown, a camera 102 is attached or integrated with a mobile unit 104 or device 104. Mobile unit 104 may represent various items that have an incorporated or attachable camera. For example, mobile unit 104 may be a mobile device such as a cell phone, as well as a robot, a vehicle, a rover, etc.

Camera 102 has a predetermined field of view 106 through which camera 102 observes the physical world at any given moment, including objects such as object 108, for example. As shown, camera 102 is in a first position relative to object 108. For ease of illustration, only one example object is shown. In various scenarios, camera 102 may observe multiple objects in field of view 106.

FIG. 2 illustrates a top-view diagram of physical environment 100, including camera 102 in a second position relative to object 108, according to some implementations. As shown, in the second position, camera 102 has moved closer to object 108 along a y-axis and has moved to the right of object 108 along an x-axis.

Figure 3:
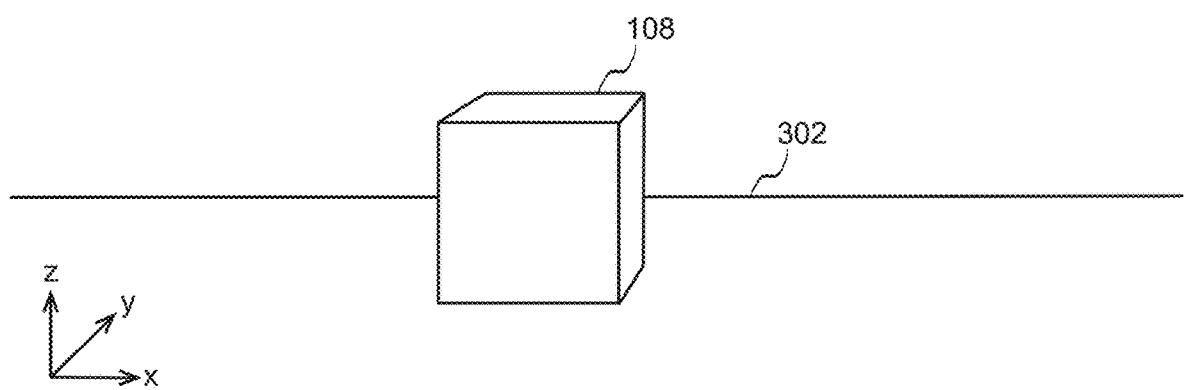
FIG. 3 illustrates a perspective-view diagram of the example object from the perspective of the camera in the first position, according to some implementations.
Figure 4:
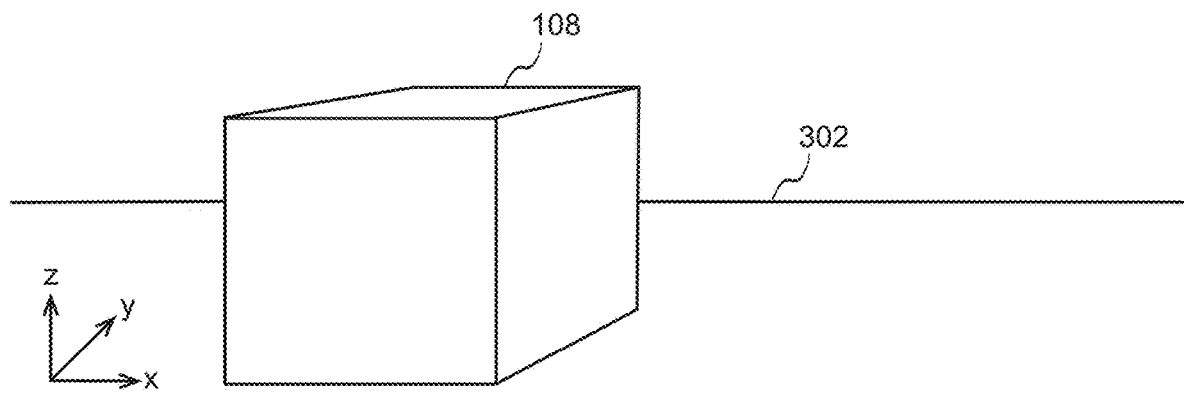
FIG. 4 illustrates a perspective-view diagram of the example object from the perspective of the camera in the second position, according to some implementations.

FIGS. 3 and 4 show perspective views of physical environment 100, including object 108, where the view of camera 102 changes as camera 102 moves relative to object 108 in the physical environment. In these example implementations, the perspective views of FIGS. 3 and 4 correspond to the top views of FIGS. 1 and 2, respectively.

FIG. 3 illustrates a perspective-view diagram of object 108 in physical environment 100 from the perspective of camera 102 in the first position, according to some implementations. As indicated above, the perspective view of FIG. 3 corresponds to the top view of FIG. 1. Also shown, is a horizontal element 302 in order to show perspective. Horizontal element 302 may represent various aspects of the physical space. For example, in some implementations, horizontal element 302 may be the horizon. In some implementations, horizontal element 302 may be the edge of a table.

FIG. 4 illustrates a perspective-view diagram of object 108 in physical environment 100 from the perspective of camera 102 in the second position, according to some implementations. As indicated above, the perspective view of FIG. 4 corresponds to the top view of FIG. 2.

For ease of illustration, camera 102 is shown to have moved on the same plane as object 108, along the x-axis and y-axis. In other scenarios, camera 102 may move along the z-axis.

As described in more detail herein, a 3D view of the physical environment may be projected into the view of camera 102 (e.g., via the camera lens of camera 102). Camera 102 may then capture images of the 3D view, including any objects in field of view 106 of camera 102. Camera 102 may capture images in multiple image frames as camera 102 moves within environment 100. Camera 102 may also function as a video camera while capturing image frames.

As described in more detail herein, a point cloud space may represent the physical environment 100, where the point cloud space is made up of map points, also referred to as feature points. These map points constitute a 3D map of the physical space. In various implementations, some of the map points may be projected into the view of camera 102, captured in two-dimensional (2D) images frames. In some implementations a point cloud space may be represented in Cartesian coordinates or in other suitable coordinate system coordinates (e.g., polar, cylindrical, spherical, and/or homogeneous coordinates, etc.). Such coordinate system coordinates uniquely determine the position of each map point in the point cloud space.

As described in more detail herein, a neural network may utilize movement information associated with the captured 2D image frames to determine the position of the camera in the point cloud space of the physical environment. The neural network may determine how the map points move. For example, a neural network may estimate 6DoF camera motion from a point cloud, or directly from pixels. Alternatively, a neural network may be used solely for the generation of feature points, which are then inputs to a traditional SLAM system. Based on movement information associated with the map points, the neural network determines the self-position of camera 102. Example implementations of the point cloud space and the determination of the self-position of a camera are described in more detail herein.

Figure 5:
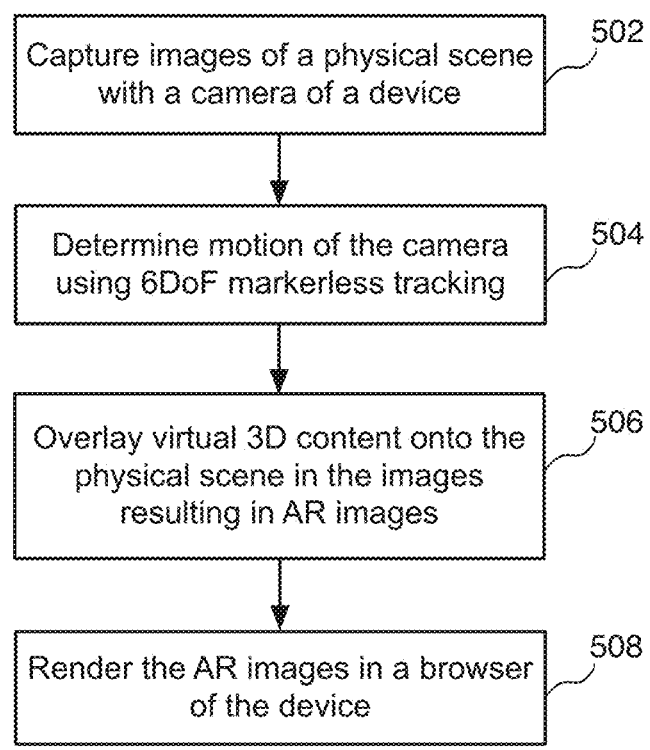
FIG. 5 illustrates an example flow diagram for providing augmented reality in a browser, according to some implementations.

FIG. 5 illustrates an example flow diagram for determining the motion of a camera, according to some implementations. In various implementations, a method is initiated at block 502, where the system captures images of a physical scene with a camera of a device. For example, FIG. 1 through FIG. 4 shows a physical scene with object 108, where camera 102 captures images of the physical scene or physical environment 100. For ease of illustration, one object (object 108) is shown with a horizon line 302 for reference. In various implementations, object 108 may represent any one or more objects in the scene and there may be any number of resting surfaces for objects represented by lines such as table edges or horizon lines.

At block 504, the system determines the motion of the camera using 6DoF markerless tracking. In various implementations, to determine the motion of the camera, the system extracts map points/feature points from the images, which may be performed by a neural network. In various implementations, the system analyzes the physical environment, including objects in the physical environment, by determining feature points from the images. The feature points may include fixed surface points in the physical scene, as well as feature points on various objects in the physical scene.

Figure 6:
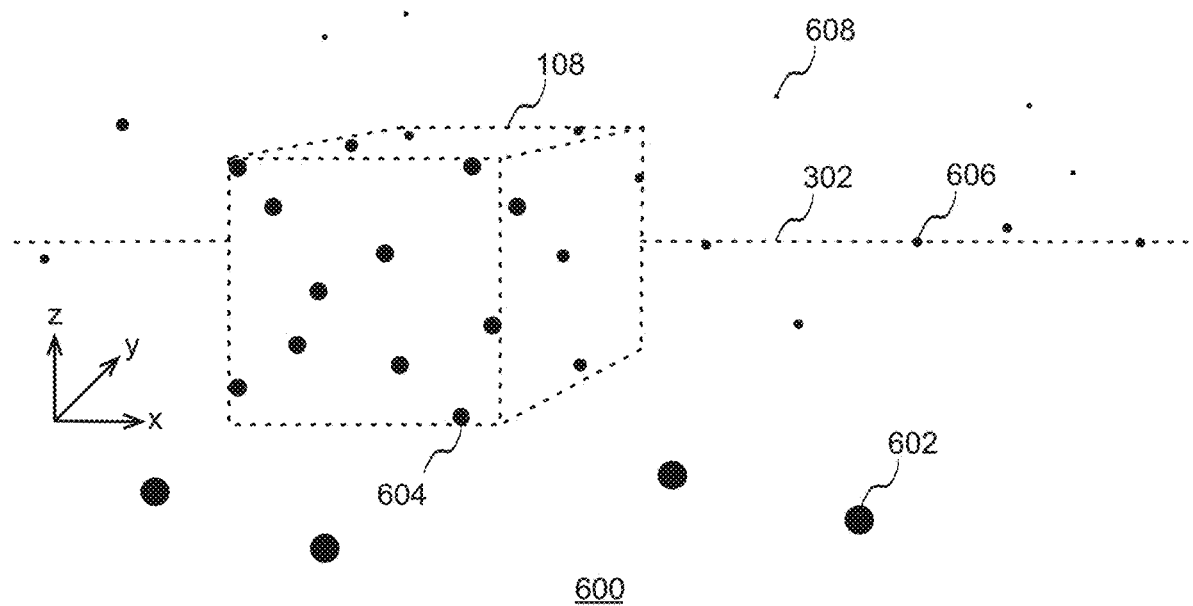
FIG. 6 illustrates map points in a point cloud space corresponding to the example object, according to some implementations.

FIG. 6 illustrates map or feature points in a point cloud space 600 corresponding to object 108, according to some implementations. In this example implementation, point cloud space 600 corresponds physical environment 100 of FIGS. 1-4. Point cloud space 600 may represent any real physical environment, and map points in point cloud space may represent multiple objects and/or portions of objects in the physical environment, where camera 102 itself is also in point cloud space 600. The term map point may be used interchangeably with the term feature point. Camera 102 is not shown in point cloud space 600, because this particular image is from the perspective of camera 102.

For ease of illustration, implementations are described herein in the context of object 108 being stationary. In some implementations, any given object such as object 108 may move within the point cloud space or move from within the point cloud space eventually out of camera 102's predetermined field of view 106. The system may take into account such movements of objects in the point cloud space.

In various implementations, the system rejects outlier points as the system tracks points. Outlier points may be point correspondences that do not match the global motion. Such outlier points may come from errant matches, repetitive textures, and/or objects in the scene that move independently from the background. In various implementations, a goal in outlier removal is to detect incorrect point correspondences and remove them before computing any global averages or motion estimates. Implementations may use any suitable outlier detection techniques such as random sample consensus (RANSAC), and others. RANSAC is a data-driven way of ignoring individual outlier points from a data sample.

In various implementations, the system may take into account various information when detecting outlier points. For example, in some implementations, outlier points may include points that move inconsistently with the majority of points in the point space; and these are ignored as likely not background. In some implementations, outlier points may include points that move inconsistently with device gyro/accelerometer data, and the system may ignore such points as likely not attached to the background. In some implementations, outlier points may be points in a local region that move independently of the background. Such points are likely part of a non-fixed object, and the system may ignore such points or may track such points as an independent object. In some implementations, outlier points may include points that appear with certain appearance/textures and are known or learned to be low-quality points. The system may ignore these points.

In various implementations, point cloud space 600 is a set of data points or map points in a 3D coordinate system. As such point cloud space 600 is a 3D map of the physical environment. Point cloud space 600 may be defined by x-coordinates, y-coordinates, and z-coordinates, where each map point in the 3D coordinate system may be referred to as a map point. Point cloud space 600 may also be referred to as a point cloud.

As indicated herein, the map points of point cloud space 600 represent portions of objects in the physical environment. For example, point cloud space 600 includes map points 602, 604, 606, and 608, among other map points. Map points 602, 604, 606, and 608 may represent any number of map points, and the particular number of map points in a given point cloud space will depend on the particular implementation.

As indicated herein, the map points are located in a 3D coordinate system. As shown, larger map points such as map point 602 are closer to the camera. Relatively smaller map points such as map point 604 are farther from camera 102. Yet smaller map points such as map point 606 are farther from camera 102. In this example implementation, the smallest map points such as map point 608 are the farthest from camera 102. These are example sizes and relative distances from camera 102. The actual distances, and corresponding sizes, may vary and will depend on the particular implementation.

In some implementations, the map points in point cloud space 600 may include subsets of map points, where a given subset of map points may represent portions of an external surface of a given object. For example, some map points such as map point 604 may corresponding to a portion of object 108. Some map points such as map point 606 may correspond to a portion of horizon 302. Other map points such as map points 602 and 608 may correspond to other objects, and the particular object will depend on the particular implementation. For example, other objects may include a table, floor or ground, a wall, a sky, etc.

In various implementations, point cloud space 600 is learned in real-time as camera 102 captures map points in image frames. In some implementations, the system may store map points of the point cloud space for future use.

In some implementations, the determination of map points may be referred to as keypoint detection. During keypoint detection, the system searches an image frame to find distinguishable map points in the image frame, where the map points are stable and repeatable across image frames. In other words, the system identifies the same map points across different image frames taken by camera 102 over time. Map points may represent areas of high texture in x-direction and/or y-direction and/or z-direction. Such map points may represent edge boundaries and/or other high-contrast and/or other landmarks or portions of objects in a point cloud space. The terms map point and keypoint may be used interchangeably.

In various implementations, the system tracks the feature points in the images using 6DoF markerless tracking. In various implementations, the system uses a neural network to perform 6DoF markerless tracking of feature points associated with objects in the images or from the pixels of the image directly. Example implementations of a neural network are described in more detail herein. In various implementations, the system detects and tracks fixed points in the physical scene as well as objects in the physical scene as the camera of the device moves through the physical environment and captures images in the physical scene.

In various implementations, markerless tracking tracks the position and orientation of a device in a physical environment based on real objects in the physical environment. In contrast from markerless tracking, marker-based tracking requires the system to locate a predetermined marker such as a quick response (QR) code in the physical environment. The system determines its location relative to the predetermined marker. Markerless tracking is much more flexible than marker-based tracking, as no predetermined marker is required.

Figure 7:
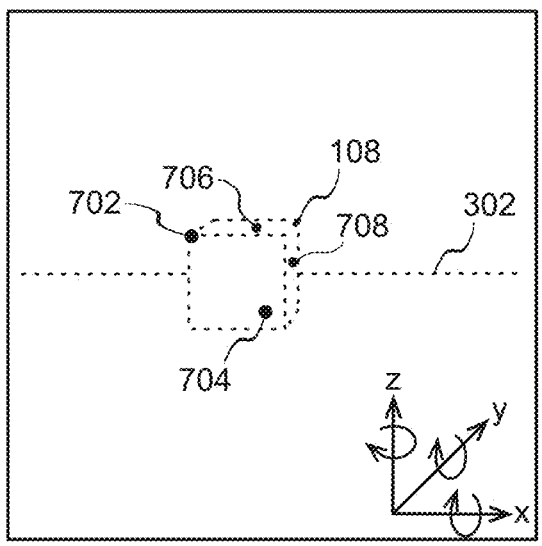
FIG. 7 illustrates an example image frame that includes example map points in a point cloud space corresponding to the example object, where the example object is captured by the camera in the first position, according to some implementations.

FIG. 7 illustrates an example image frame 700 that includes example map points in a point cloud space corresponding to object 108, where object 108 is captured by the camera (not shown) in the first position, according to some implementations.

As shown, image frame 700 shows example map points 702, 704, 706, and 708. While map points 702, 704, 706, and 708 are shown in a 2D image frame, map points 702, 704, 706, and 708 are associated with 2D and 3D positional information. For example, each of map points 702, 704, 706, and 708 has associated including x-, y-, and z-locations, as indicated by the x-y-z directional arrows in the x-y-z axis shown. Each of map points 702, 704, 706, and 708 also has associated x-, y-, and z-orientations, as indicated by the x-y-z rotational arrows in the x-y-z axis shown. Further example implementations of 2D and 3D positional information are described in more detail herein.

For reference and perspective, FIG. 7 also shows an indication of example object 108 and horizon 302 (indicated with dotted lines). As indicated herein in connection with FIG. 6, map points may be associated with various different objects in point cloud space 600.

Figure 8:
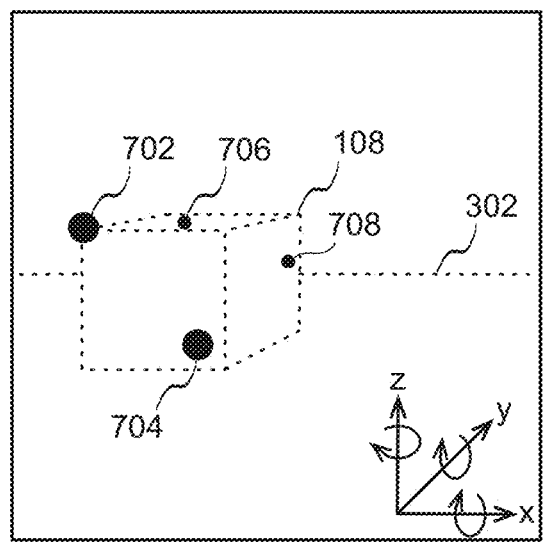
FIG. 8 illustrates an example image frame that includes example map points in a point cloud space corresponding to the example object, where the example object is captured by the camera in the second position, according to some implementations.

FIG. 8 illustrates an example image frame 800 that includes example map points in a point cloud space corresponding to object 108, where object 108 is captured by the camera (not shown) in the second position, according to some implementations. For ease of illustration, two image frames 700 and 800 are shown in FIGS. 7 and 8. The system continually captures image frames for analysis. The system tracks feature points, and thus objects associated with the feature points in 6 degrees of freedom using markerless tracking. Example implementations for processing image frames in order to provide augmented reality in a browser are described in more detail herein.

As shown, image frame 800 shows map points 702, 704, 706, and 708, as well as an indication of object 108 and horizon 302. Note that the sizes of the circles shown are merely illustrative to show points that are closer or farther away in the 3D space. For example, the sizes of the circle corresponding to the map points may be inversely proportional to the proximity to camera 102. In other words, the shorter the distance of a given map point to camera 102, the larger the circle. For example, comparing image frame 800 of FIG. 8 to image frame 700 of FIG. 7, map points 702, 704, 706, and 708 of image frame 800 are shown as larger circles than those of image frame 700, because the map points of image frame 800 are relatively closer to camera 102. The increased size and change of positioning of object 108, as indicated by the dotted lines, provides additional perspective on the change of position of each of map points 702, 704, 706, and 708 from image frame 700 to image frame 800.

In various implementations, time lapse from image frame to image frame may be relatively small (e.g., milliseconds, microseconds, etc.), and the actual time between two image frames may vary depending on the particular implementation. For ease of illustration, in this example implementation, image frame 800 is presumed to have been captured a sufficient amount of time after image frame 700 was captured in order to show sufficient differences between image frames 700 and 800.

Similar to image frame 700 of FIG. 7, map points 702, 704, 706, and 708 as shown in image frame 800 of FIG. 8 are associated with 2D and 3D positional information, including x-, y-, and z-locations, and rotation about the x-, y-, and z-axes. In various implementations, there may be various ways to express rotations, such as including three independent rotations about axes (e.g., Euler angles/Tait-Bryan Angles), a Rotation matrix (e.g., either 3×3 or 4×4 with homogenous coordinates), or quaternions (e.g., 4×1 normalized vector with special operations for rotation). Further example implementations of 2D and 3D positional information are described in more detail herein.

For ease of illustration, FIGS. 7 and 8 show an example subset of map/feature points. The actual map points observed and tracked, and object(s) to which the map points are associated, will vary and will depend on the particular implementation. In other words, example image frames 700 and 800 may not have all of the map points shown and/or may have other map points including map points associated with other objects instead of, or in addition to, those shown herein.

Referring again to FIG. 5, at block 506, the system overlays virtual 3D content onto a depicted physical scene in the images, resulting in augmented reality (AR) images. As described in more detail herein, the virtual 3D content is computer-generated content that the system accesses using various web technologies.

Figure 9:
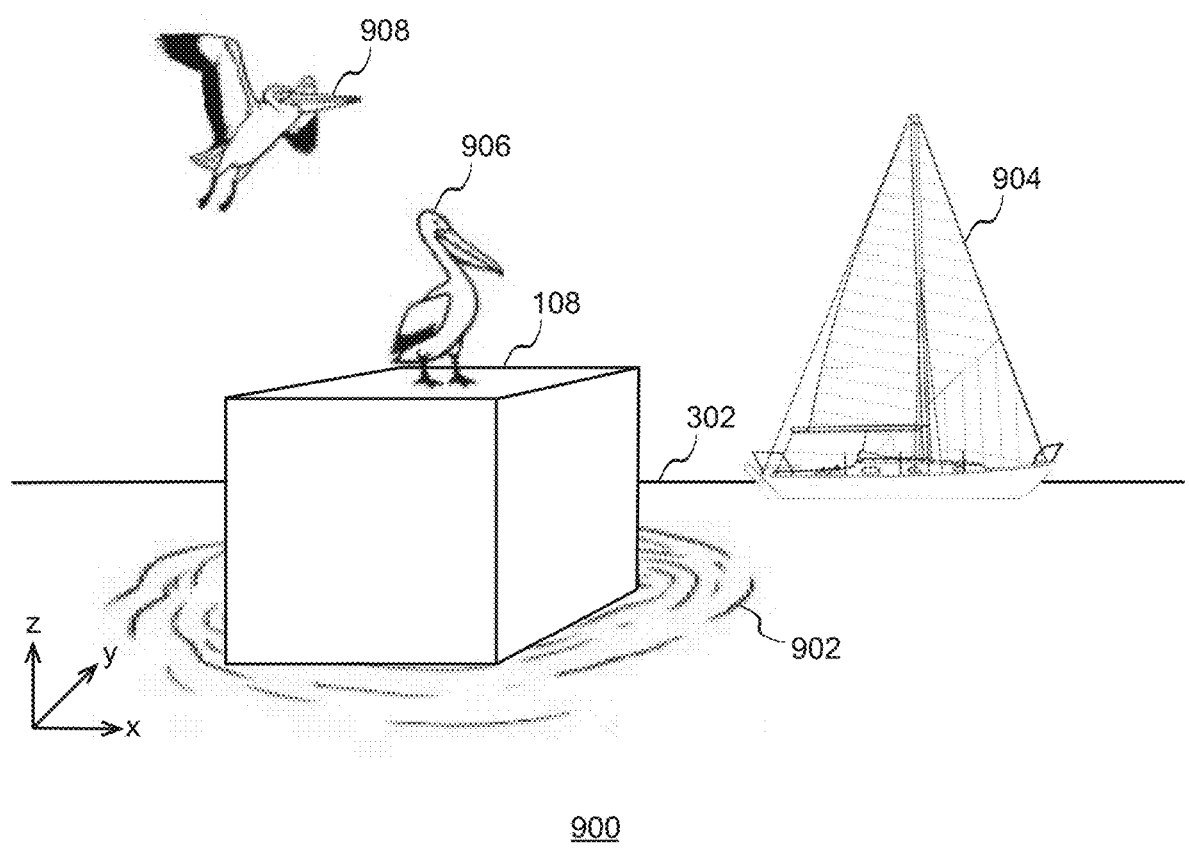
FIG. 9 illustrates an example object from an image frame and virtual 3D objects overlaid on the objects from the image frame, according to some implementations.

FIG. 9 illustrates an example object from an image frame and virtual 3D objects overlaid on the objects from the image frame, according to some implementations. Shown is object 108 and horizon 302 from the physical scene. Also shown are various virtual 3D objects that are overlaid on the physical scene. For example, an object 902 representing water is shown underneath and around portions of object 108. This provides an effect of object 108 floating on water. An object 904 representing a sailboat is shown closer to horizon 302. This provides an effect of a sailboat floating on the water. Also shown is an object 906 representing a pelican standing on object 108 and an object 908 representing a pelican flying toward object 108.

The specific types of virtual 3D content may vary, depending on the particular implementation. While the example content shown involves a theme (e.g., an ocean theme), the content may include any theme or themes, or any group of objects that may or may not fall into a particular theme. Furthermore, while implementations are described herein in the context of virtual visual objects, the system may augment the physical scene with various types of perceptual information. For example the system may augment the physical scene/user experience across various sensory modalities (e.g., visual, auditory, haptic, somatosensory, olfactory, etc.). The particular augmentations and/or combination of sensory modalities may vary, depending on the particular implementation. In some implementations, the system may conform virtual 3D objects to the perspective captured in the image frame (e.g., virtual train tracks having the same perspective as real life train tracks disappearing into the distance). Also, the system may scale virtual 3D objects to match the scale in the image frame.

Referring still to FIG. 5, at block 508, the system renders the AR images in a browser of the device. The rendered AR image is a 3D scene that the user can interact with in the browser of the device. The particular type of device may vary, depending on the particular implementation. For example, in various implementations, the device is a mobile device. The mobile device may be a smart phone, a tablet, a notebook computer, a smart watch or other wearable device (e.g., smart glasses, etc.).

Figure 10:
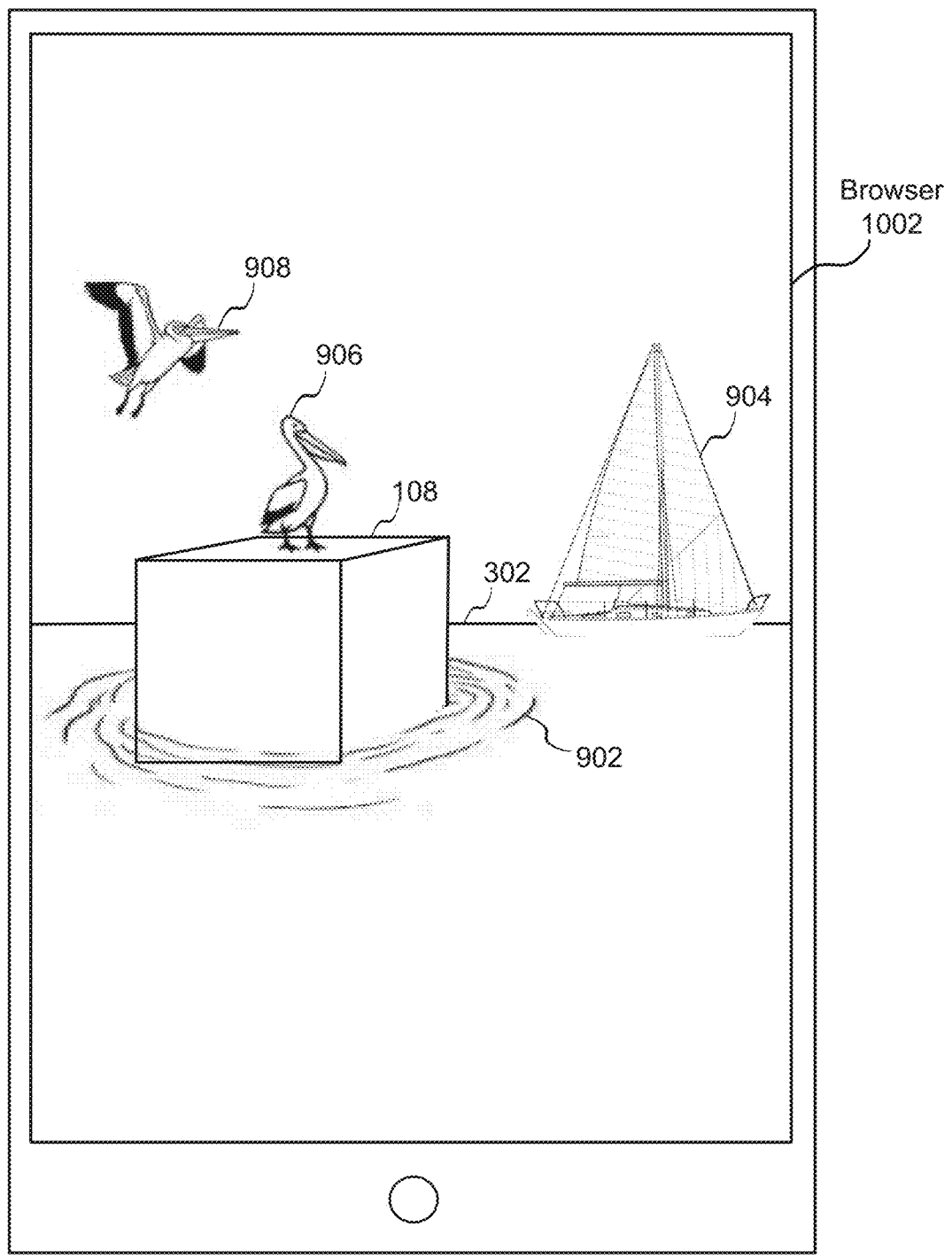
FIG. 10 illustrates an example augmented reality scene that is displayed in a browser, according to some implementations.

FIG. 10 illustrates an example augmented reality scene that is displayed in a browser, according to some implementations. Shown is the AR scene of FIG. 9 rendered on a mobile device 1000. More specifically, the system is rendering the AR scene in a browser 1002 of mobile device 1000. In various implementations, the system enables the user to add virtual objects, remove virtual objects, and manipulate virtual object in the rendered AR scene as the user and camera move through the physical scene. In various implementations, the system enables the user to modify all objects in the rendered AR scene (e.g., change colors, add or remove visual effects, etc.).

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

The following describes various web technologies that enable the system to provide AR scenes in a web browser based at least in part on a web application that is executed in the browser. Various web technologies that enable fast execution of the web application in the browser are described in more detail herein.

In various implementations, the system performs operations to provide AR in a browser based at least in part on a predetermined subset of JavaScript transpiled or compiled from source code of another programming language that has a similar or different level of abstraction. Various transpiler and/or compiler techniques may be used to transpile/compile/transform source code written in one language to JavaScript, Web Assembly, or any other format that can be interpreted and executed by a web browser. For example, in some implementations, a source-to-source compiler runs as a back end to a low-level programming language (LLVM) compiler to output the predetermined set JavaScript. An example source-to-source transpiler or compiler or may include Emscripten or another suitable source-to-source compiler.

In various implementations, the predetermined subset of JavaScript may vary, depending on the particular implementation. For example, in some implementations, the predetermined subset of JavaScript may be asm.js. In some implementations, the compilation target may also include other web-executable input formats such as WebAssembly. As such, a SLAM engine may be written in a language such as C++ and then be transpiled or compiled into a predetermined subset of JavaScript such as asm.js, WebAssembly, etc. The resulting subset of JavaScript or webcode may be stored in a library such as an asm.js library, WebAssembly library, etc.

In various implementations, the predetermined set of JavaScript enables computer software written in languages such as C, C++, etc. to be run as web applications while maintaining performance characteristics substantially better than standard JavaScript, almost as fast as native code. For example, the resulting SLAM tracker may run at 5 frames per second. As described in more detail herein, the system may use additional web technologies to increase performance (e.g., 30 frames per second, 60 frames per second, etc.). Such increased speeds enable fast markerless SLAM tracking without the need for marker-based tracking and without needing a specialized browser.

In some implementations, a bitcode generator or compiler front end may be used on top of an LLVM compiler. The LLVM compiler takes code and converts the code to an intermediate representation, which then may be optimized before the final assembly language output. The particular compiler front end may vary, depending on the particular implementation. An example compiler front end may be Clang. For example, Clang may be the compiler front end that drives the actual LLVM compiler. A compiler or transpiler such as Emscripten, for example, may consume the output of a bitcode generator/compiler front end, and compile or transpile it to the predetermined subset of JavaScript for yet faster speed for the purpose of markerless 6DOF tracking.

In some implementations, C++ code may be revised specifically to optimize the performance of the generated JavaScript. For example, in some implementations, portions of the C++ code may written such that the system avoids simultaneous reading from one block of memory and writing to another block of memory. This substantially improves the efficiency of the generated JavaScript.

In some implementations, the system uses a graphics card to access a standard graphics library to execute the web application and other web technologies on the web. The graphics card may be standard on the device. Such libraries are used for code that runs on a graphical processing unit (GPU). In various implementations, the system causes a GPU of the graphics card to perform computations by using a rendering pipeline, which renders computer vision features. An example rendering pipeline implementation is described in more detail herein. The system executes on the graphics card not only for rendering images but also for processing images and associated data. Graphics libraries may include, for example, standard web graphics framework such as Web Graphics Library (WebGL), or other web graphics frameworks, including ones based on future standards.

In various implementations, the system processes the images using a computer program executed on a graphics processing unit (GPU). The system extracts feature points from the images using a shader, or performs other computations, which may or may not be an implementation of a neural network or other machine learning system. The system also performs runtime optimizations to JavaScript frameworks (e.g., by adding caching layers to improve their speed). In various implementations, a shader is a small program in the GPU that run for specific sections of the graphics pipeline. In various implementations, the system uses a shader to access the application programming interface (API) to the graphics library and to perform a combination of image filtering and feature point extraction. The system uses the shader to produce inputs to a JavaScript computer vision library. The system may then use a WebGL rendering loop to perform fast work using a GPU, work that would otherwise be performed more slowly by a CPU and JavaScript, or to execute code in parallel on different computational subsystems.

In various implementations, the graphics library used is a library for programming code that goes onto a graphics card. In various implementations, a transpiler or compiler may be used to take OpenGL code (C++ code) and transpile or compile it into WebGL code (JavaScript code). In some implementations, everywhere that C++ code has a call to a graphics library function (e.g., OpenGL function), the system replaces it with a JavaScript call to a JavaScript WebGL function. In some implementations, the system may augment existing JavaScript frameworks in order to improve their efficiency. For example, the system may adding a cache layer to WebGL.

In various implementations, the system performs operations including performing multithread execution of JavaScript in the browser. Implementations use web technologies in web browsers that enable the system to run pieces of work asynchronously on a different CPU thread, which enables multithreaded JavaScript execution. This is especially beneficial for utilizing multiple CPUs in a standard mobile device. This overcomes the limited efficiency of typical web applications that are limited to a single CPU thread. For example, the system may run a script operation in a background thread or worker thread that is separate from the main execution thread of a web application. As such, the background thread performs computations that consume a substantial amount of resources and time. This frees up the main execution thread to optimally run without compromising speed. In some implementations, to achieve this, the system may use a worker constructor to create a worker object that executes a script (e.g., a JavaScript file, etc.) that is run in the background thread. A worker constructor may be Web Workers, for example.

In various implementations, the system utilizes a pixel-processing or computation pipeline that maximizes throughput in order to process as many frames as possible. This pipeline utilizes multiple processors, including GPUs and CPUs, in parallel. The GPU on the graphics card performs work while the CPUs are processing data, where the GPU is zero or more steps ahead of the CPU. The GPU renderer is zero or more frames behind the CPU. This parallelism enables two or more different processing units on the device to work simultaneously.

In some implementations, within a frame (independent of the pipeline), the order of issuing graphics processing, cpu processing, and graphics rendering functions, are optimize either statically, dynamically based on device characteristics, or dynamically based on runtime characteristics. Also, the pipeline execution strategy is optimized to have, for example, 0, 1, 2, 3, or more frames of delayed processing to maximize the balance of tracking accuracy and frame throughput. In the case of 0, the GPU and CPU work occur sequentially in a single frame. In the case of 1, the GPU and CPU work occur in parallel as described herein. In the case of 2, there is a single buffer frame. In the case of 3, there are two buffer frames, etc. The pipeline is optimized statically. For example, the system may select a good default behavior when nothing is known about the device. The is particularly helpful if there is no policy for a particular device model (because it was not released at the time the code was written). In some implementations, the pipeline may be preconfigured ways based on mappings to known device characteristics, or at runtime based on actual observed performance.

Figure 11:
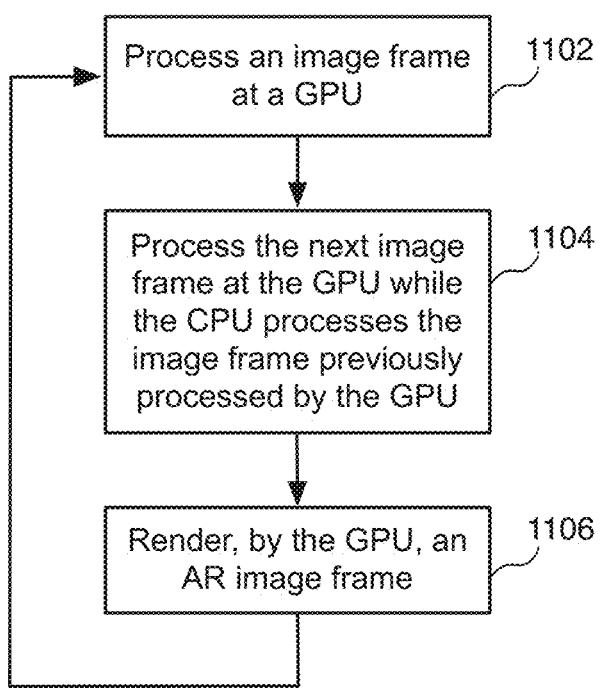
FIG. 11 illustrates an example flow diagram for executing a computation pipeline, according to some implementations.

FIG. 11 illustrates an example flow diagram for executing a computation pipeline, according to some implementations. In various implementations, the system determines in advance or at runtime an execution strategy to use to optimize performance. As described in more detail below, the system processes images in a pipeline using at least one central processing unit (CPU) and/or at least one graphics processing unit (GPU). In various implementations, the system offsets the GPU and CPU operations such that the GPU starts processing the next frame that a CPU will eventually process, while the CPU is processing the current frame. This doubles the throughput, as the processors perform in parallel. In other words, the system run the graphics card while the CPU is running on the previous image.

In various implementations, a method is initiated at block 1102, where the GPU of the system processes an image frame that will be processed by a subsequent CPU. After processing, the GPU passes the processed image frame to the CPU.

At block 1104, the GPU then processes the next image frame while the CPU processes the image frame that was previously processed by the GPU. After processing, the GPU passes the processed next image frame to the CPU, and the CPU passes the processed first image frame to another CPU for process or directly back to the GPU to render an AR image frame.

At block 1106, the GPU renders an AR image frame. In some implementations, the GPU may render the AR image frame immediately when ready. In some implementations, the GPU may render the AR image frame after a predetermined buffer time, depending on the number of CPUs processing the image frames. Example implementations involving buffer frames are described in more detail herein. The process repeats for incoming image frames.

At block 1102, the CPU processes the next image frame and the at least one GPU processes a second image simultaneously.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

The following is an example implementation involving a computation pipeline. In the following example implementations, the pipeline includes one GPU and one main CPU.

Figure 12:
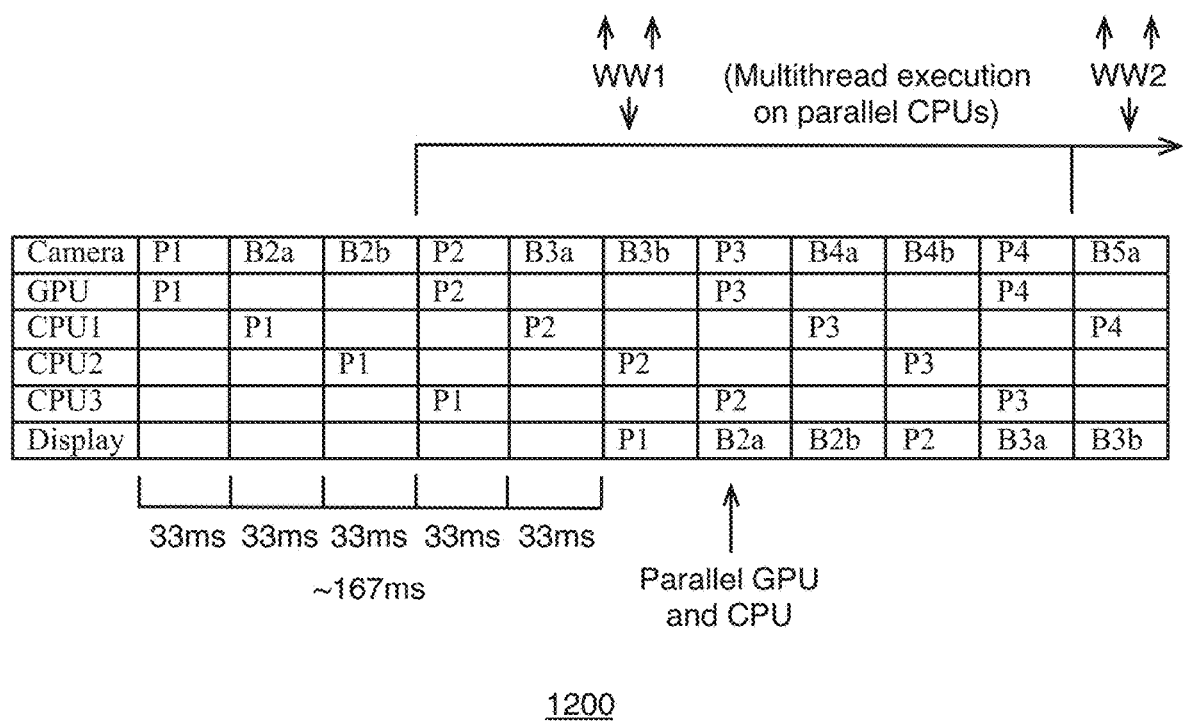
FIG. 12 illustrates a block diagram of an example computation pipeline, which may be used for some implementations described herein.

FIG. 12 illustrates an example computation pipeline 1200, according to some implementations. Shown are image frames captured by the camera, labeled P1, P2, P3 and P4. Also shown are buffer frames, labeled B2a, B2b, B3a, B3b, B4a, B4b, B5a, etc.

Also shown is Web Worker work (labeled WW1 and WW2) occurring in parallel on multiple CPUs (e.g., the main CPU and other CPUs not shown, etc.). As indicated above, web technologies such as Web Workers make use of multiple CPUs. While one main CPU is shown, Web Workers depicted outside of the table make use of auxiliary CPUs to perform multithread execution of JavaScript in the browser.

As shown, Web Worker WW1 is taking the results from image frame P1, doing some further processing on those results, and returning them when it is finished. At that point, Web Worker WW2 is performing further processing on the results from image frames P2 and P3, which have accumulated while Web Worker WW1 was running. In some implementations, the further processing of image frame P1 may occur on a single thread or multiple threads. In other implementations, a Web Worker may start the further processing for image frame P2 while image frame P1 is running. Examples of what the Web Works work on may include building or improving a SLAM map, or relocalizing while tracking is lost, etc.

Also shown in pipeline 1200 are a GPU and a CPU for multiple stage pipelining and interpolation for the use case of 6DoF tracking on the web. As shown, after the camera captures an image frame such as image frame P1, the GPU processes image frame P1, which will be processed by subsequent CPU stages. The GPU processes the image frame to extract feature points.

After processing, the GPU passes processed image frame P1 to the CPU. The CPU maps the feature points from the previous frame already processed by the GPU. In various implementations, the processing of the CPU is split into multiple stages (labeled CPU1, CPU2, and CPU3) and split across several captured/displayed camera frames. As such, image frame P1 is propagated to the rest of the CPUs. These multiple stages may be referred to as CPU processing stage 1, CPU processing stage 2, and CPU processing stage 3.

After the CPU processes image frame P1, the CPU sends image frame P1 back to the GPU for rendering. Knowing the locations of the feature points based on processing at the CPU, the GPU renders the AR scene with location updates.

After the GPU processes the first image frame P1, the GPU passes buffer frames B2a and B2b to the CPU and so on until displayed. Buffer frames B2a and B2b allow for multiple CPU stages to process image frames. The particular number of buffer frames may vary, depending on the number CPU processing stages. The GPU renders image frame P1 just prior to the completion of the CPU processing the next image frame P2, and so on.

In this particular example, for each image frame, there are 5 stages from being first processed by the GPU until the final rendering on the display screen. Each stage in this example is 33 ms the GPU, totaling 167 ms. As such, it takes 167 ms to be displayed.

As shown, for some image frames, the GPU work occurs in parallel with the CPU work. For example, the GPU processes image frame P2 while the CPU processes image frame P1. The GPU work may occur in parallel with a CPU on zero, one, or several frames, depending on the implementation.

In this example implementation, the system spreads computations across more than one frame (e.g., three frames with the use of buffer frames B2a, B2b, B3a, B3b, B4a, Bob, B5a, etc. The buffer frames are not processed before display, and are saved for later display. When an image frame is processed, the system displays all of the buffered frames first, using interpolated values from the previously processed frame. The system then displays the processed image frame, all while processing the next frame to process. The buffering is useful for some older devices, where it might not be possible to process an entire GPU/CPU frame in subsequent cycles.

As shown, buffered frames B2a, B2b, B3a, B3b, B4a, Bob, B5a, etc. are numbered to appear before a respective processed image frame. For example, in some implementations, buffer frames B2a and B2b appear before image frame P2. For example, as soon as image frame P2 has been processed by the GPU and the CPU, the system first displays buffer frame B2a and B2b, and then displays image P2. In some embodiments, at the start of the pipeline, the display of P1 is held until just prior to the frame on which the B2a/B2b/P2 triple become available for display.

This eliminates the need for separate stacks (e.g., GPU stack, CPU stack, and render stack) that run serially. Eliminating the separate stacks triples the process time. The system may use web technology such as Web Workers, for example, run code on additional threads in the background.

In some implementations, at runtime, the system may switch between different computation pipelines, where each computation pipeline has different numbers of CPU processing stages. The system may switch between different computation pipelines based on predetermined rules and/or policies based on device characteristics, or based on runtime performance evaluation, etc.

In various implementations, example static policies may include the following. If the system detects from the user agent string and debug renderer information that the device is a new, top tier phone, the system may select a one stage pipeline. If the system detects that the device is a three-year old mid-range phone, the system may select a three-stage pipeline. These policies may be coded to react in a predetermined way to the characteristics of the device they are running on.

In various implementations, example dynamic policies may include the following. If the system detects at runtime that it is running at 10 frames per second (regardless of phone tier), the system may select a pipeline with more stages. If the system detects that it is running at 40 frames per second (regardless of phone tier), the system may select a pipeline with fewer stages. These policies may be coded to react to the observed performance characteristics at runtime.

In various implementations, the system captures various data including camera image data and inertial measurements. The system may then use this data to render AR images. More specifically, in various implementations, the system may use a JavaScript function to access such data using libraries provided by the browser. The JavaScript function may be getUserMedia, for example. The JavaScript may be used for access to the camera feed, or the device orientation callback may be used for inertial measurement unit (IMU) access. In various implementations, sensor data (e.g., camera feed, IMU, etc.), which come from the browser directly. Other sensor characteristics (e.g., focal length, principal point, distortion parameters, etc.) that are not given directly, may be estimated at runtime by the system analyzing sensor data. The system may also estimate these characteristics using user agent string, debug renderer info, screen resolution, etc. in order to match to a library of pre-calibrated device profiles.

In various implementations, the system accesses from the device one or more of sensor data, camera image data, and inertial measurements using web frameworks. The system may use the sensor data, camera image data, and inertial measurements in the pipeline. As a result, the system may render AR images based at least in part on one or more of the sensor data, the camera image data, and the inertial measurements.

In various implementations, the system renders the virtual 3D content using a 3D rendering engine and one or more JavaScript 3D content libraries. The system may user various combinations of 3D rendering engines to render 3D content in AR images on the web, depending on the implementation. Such 3D rendering engines may involve 3D authoring tools and 3D content libraries, depending on the implementation.

The system renders the AR frame, thereby drawing the AR frame onto the screen. The system also drives a virtual camera through a virtual scene. To achieve this, the system sets the camera at the same field of view as the virtual scene. The system drives the camera's motion by the actual motion. Possible 3D rendering engines use may include A-Frame, 3JS, Sumerian, Unity 3D, etc.

In some implementations, the system may make runtime modifications to web frameworks in order to improve their efficiency, for example by adding caching or overrides to default behavior. Specifically, in some implementations, when the system runs the AR web application (e.g., image processing, etc.), the system utilizes Javascript to allow for runtime behavior of objects, where request caching functionality is added to the WebGL functions. This significantly speeds up the operations and enables a computer vision library to live alongside other rendering libraries. In some implementations, default overrides may be added such that when the old functionality was requested, an object that also supported by functionality is returned. As such, the system may make use of new functionality alongside existing libraries.

In various implementations, the system may further improve the 6DoF tracking quality and the overall AR experience based on determining physical characteristics of the camera of the device. For example, the system may use a parsing technique such as User Agent Parsing to collect information. Such information may include device screen resolution, GPU debug information (which may include information about the GPU chip, etc. Furthermore, the system maintains a library of phones and corresponding measured characteristics. In some implementations, the system obtains camera data from a device library via the browser. The system parses the camera data. For example, the system takes a string and identifies the make and model of the device. The system also determines one or more intrinsic parameters of the camera from the parsed data. The intrinsic parameters may include field of view, principle point, distortion parameters, etc. If the make and model of the device is not readily available, the system may determine the intrinsic parameters based on other queryable device characteristics (e.g., screen resolution, debug renderer information, etc.), or may be determined at runtime by analyzing the camera feed and IMU data. For example, they system may look up the device in a database of intrinsic parameters in a device library. In some implementations, the system may dynamically adjust and improve the intrinsic parameter estimate by minimizing reprojection error using statistical estimation techniques as the system tracks the camera movement.

In various implementations, the neural network of the system determines the differences from one image frame to the next image frame (e.g., from image frame 700 of FIG. 7 to image frame 800 of FIG. 8) based on the positional information associated with each image frame that is input to the neural network.

Figure 13:
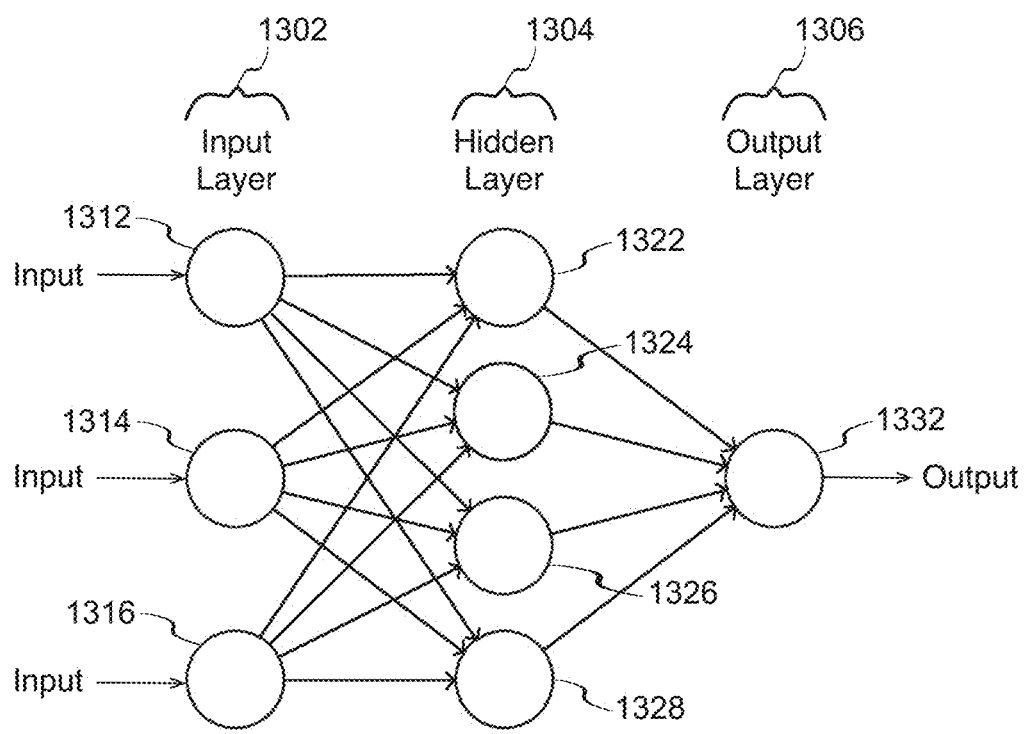
FIG. 13 illustrates a block diagram of an example neural network, which may be used for some implementations described herein.

FIG. 13 illustrates a block diagram of an example neural network 1300, which may be used for some implementations described herein. Various implementations described herein, including the determination of the motion of the camera is performed by neural network 1300. In various implementations, as information flows through neural network 1300, neural network 1300 adapts or learns based on the information each node receives. As such, neural network 1300 is a computational model based on the structure and functions of biological neural networks. Neural network 1300 may also be referred to as an artificial intelligence neural network or neural net.

As shown, neural network 1300 has an input layer 1302, a hidden layer 1304, and an output layer 1306. Input layer 1302 includes input nodes 1312, 1314, and 1316. Hidden layer 1304 includes hidden nodes 1322, 1324, 1326, and

1328. While one hidden layer is shown, there may be zero hidden layers, one hidden layers, or more than one hidden layer. Output layer 1306 includes output node 1332.

In various implementations, the nodes of neural network 1300 are connected by unidirectional communication channels or connections, which carry numeric data. In some implementations, the nodes operate on their local data and on the inputs they receive via the connections.

In various implementations, neural network 1300 receives at its input nodes 1312, 1314, and 1316 from various inputs associated with map points. For example, in various implementations, input to neural network 1300 includes images such as digitized 2D image frames captured by a camera.

In various implementations, neural network 1300 may receive at its input nodes 1312, 1314, and 1316 other types of information associated with a camera. For example, in some implementations, input to neural network 1300 may also include inertial information associated with a camera. In some implementations, the inertial information may include gyro information provided by one or more gyro sensors, acceleration information provided by an accelerometer, compass information provided by a compass, and other types inertial information. In some implementations, the inertial information may be used to determine translational and/or rotational changes of a camera. In some implementations, input to neural network 1300 may also include depth information provided by one or more depth sensors, and other information associated with one or more virtual feature points in images captured by a camera. Neural network 1300 may use any combination of these types of inputs including sensor information independently, in addition to, or in lieu of visual information such as image frames.

In various implementations, hidden nodes 1322, 1324, 1326, and 1328 each have an output that is connected to the inputs of other nodes, which may include other hidden nodes or output nodes. Hidden nodes are hidden in that they not visible as a network output. Based on the various inputs, hidden nodes 1322, 1324, 1326, and 1328 determine 2D and 3D changes in positional information. As indicated herein, in various implementations, information associated with 3D changes in the 3D environment inherently includes information associated with 2D changes in 2D windows of image frames. For example, such changes may include changes to six degrees of freedom variables of one or more map points, as well as changes in other variables associated with one or more physical feature points (e.g., changes in inertial information, changes in depth information etc.).

Neural network 1300 determines actual motion of a camera within the 3D environment from 2D digitized image frames and/or other sensor information (e.g., inertial information, depth information, and other information input to neural network 1300, etc.). In other words, neural network 1300 determines not merely motion within the 2D image frames but also other information in the real world, such as 3D motion and changes in 3D positional information associated with physical feature points in the physical environment.

Neural network 1300 may determine any translational motion of camera 102. For example, neural network 1000 may determine that camera 102 has moved closer to object 108 by a particular distance (e.g., 4 feet, etc.). Neural network 1000 may determine any rotational motion of camera 102. For example, neural network 1300 may determine that camera 102 has rotated relative to object 108 by a particular number of degrees (e.g., 20 degrees, etc.). These are example changes in the position of camera 102 relative to object 108. The actual amount of change and what variables change (e.g., six degrees of freedom variables) may vary, and will depend on the particular implementation. Alternatively, a neural network may extract key points that are inputs to a SLAM system.

In various implementations, hidden nodes 1322, 1324, 1326, and 1328 of neural network 1300 may determine various information associated with one or more physical feature points in the physical environment. For example, hidden nodes 1322, 1324, 1326, and 1328 may determine any motion information, including what positional information (e.g., positional variables, etc.) that has changed, and the amount of change. In various implementations, hidden nodes 1322, 1324, 1326, and 1328 of neural network 1300 perform their functions in parallel, which increases performance. Outputs provided by hidden nodes 1322, 1324, 1326, and 1328 may be referred to as intermediate outputs.

In various implementations, neural network 1300 automatically learns and automatically reconciles information from visual and sensor data from camera 102 and/or one or more sensors. For example, neural network 1300 may combine visual or sensor information that corroborates, where information corroborates if the information is consistent. Neural network 1300 may ignore visual or sensor information that does not corroborate, where information does not corroborate if the information is not consistent.

As described in more detail herein, neural network 1300 may predict all the virtual feature points that may be relevant in subsequent image frames. Such information may be used to remove jitter and or any shakiness in a given image frame.

As described in more detail herein, in various implementations, output node 1332 of neural network 1300 outputs a self-position of camera 102 in the physical environment, as wells changes in position (motion) of camera 102 in the physical environment from the capturing of one image to the next. In various implementations, neural network 1300 outputs higher quality estimates of total global motion based on the motion information.

For ease of illustration, FIG. 13 shows neural network 1300 as having three inputs 1312, 1314, and 1316, four hidden nodes 1322, 1324, 1326, and 1328, and one output node 1332. Neural network 1300 may have any number of input nodes, hidden nodes, and output nodes, and the particular numbers will depend on the particular implementation. Similarly, FIG. 13 shows neural network 1300 as having one hidden layer. Neural network 1300 may have any number of hidden layers, and the particular number will depend on the particular implementation. In various implementations, neural network 1300 may not have all of the components shown and/or may have other elements including other types of nodes and other types of layers instead of, or in addition to, those shown herein.

In some implementations, neural network 1300 is a recurrent neural network. In various implementations, a recurrent neural network has "memory" in that the recurrent neural network uses information from previous network evaluations as inputs to the network for future evaluations. In the context of implementations described herein, a recurrent neural network may be used to implicitly remember appearance information about points in the map point space that are being tracked. A recurrent neural network may also be used to remember motion patterns and model the active motion characteristics (e.g., velocity, acceleration, jitter, etc.).

In some implementations, neural network 1300 is a convolutional neural network. In various implementations, a convolutional neural network has convolutional layers within the network, where each convolutional layer may be a function applied to a subwindow around that position in the prior layer. The functions may be trained to be identical throughout the layer. In various implementations, the functions may be 2D feature patches that provide representational information about 2D images.

In some implementations, the determining of motion information is based on training of the neural network. Such training may facilitate neural network 1300 in understanding local movement of various virtual feature points between image frames. For example, training may facilitate neural network 1300 in interpreting observed behaviors associated with six degrees of separation and how such behaviors manifest in the physical environment.

In various implementations, training may include providing ground truth to the neural network (known inputs and outputs). Through optimized gradient descent and similar techniques, training may also include adjusting network weights such that a provided input activates the neural network to produce the provided output (or close to it).

In various implementations, ground truth for the system may be generated in any of the following ways. In some implementations, the system may render realistic, synthetic 3D scenes (e.g., computer graphics) along with the corresponding 3D depth information, and generate videos of a synthetic camera moving through the scene. This visual data may be used to train a system that learns to recognize motion from the synthetic video. This approach may be augmented by including synthetic sensor data as well (e.g., gyro, accelerometer, etc.) by mimicking the real motion and adding noise to the measurements.

In some implementations, the system may use an alternative (and possibly slow but accurate) SLAM system to generate the ground truth. For example, the system may capture video and sensor data coming from a cell phone or other capture device. This data may be passed to a conventional SLAM system that computes the motion output. This computed output along with the captured input may be used as ground truth to train the network. Since the ground truth data does not have to be computed in real time, the conventional SLAM system may be run in a slow (non-real time) but high-accuracy, high-computation mode to ensure the quality of the computed output is good.

In some implementations, the system may capture ground truth data with a specialized hardware system or hardware device. In various implementations, the hardware system or hardware device is configured for high accuracy. For example, the sensor and video input data may be captured by a hardware device such as a cell phone, which is itself being tracked by a cinematic motion capture system to determine the highly accurate ground truth data such as exact position and motion of the hardware device. Such truth data may then be inputted into the neural network for training.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 14:
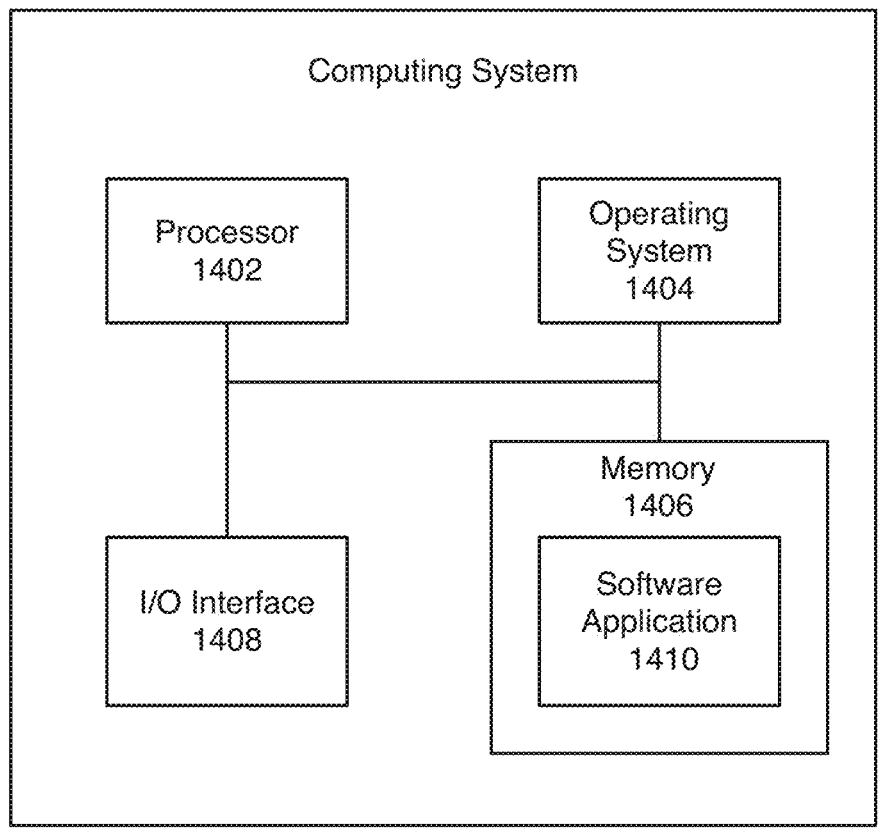
FIG. 14 illustrates a block diagram of an example computing system, which may be used for some implementations described herein.

FIG. 14 illustrates a block diagram of an example computing system 1400, which may be used for some implementations described herein. For example, computing system 1400 may be used to implement neural network 1300 of FIG. 13, as well as to perform implementations described herein. In some implementations, computing system 1400 may include a processor 1402, an operating system 1404, a memory 1406, and an input/output (I/O) interface 1408. In various implementations, processor 1402 may be used to implement various functions and features described herein, as well as to perform the method implementations described herein. While processor 1402 is described as performing implementations described herein, any suitable component or combination of components of computing system 1400 or any suitable processor or processors associated with computing system 1400 or any suitable system may perform the steps described. Implementations described herein may be carried out on a user device, on a server, or a combination of both.

Computing system 1400 also includes a software application 1410, which may be stored on memory 1406 or on any other suitable storage location or computer-readable medium. Software application 1410 provides instructions that enable processor 1402 to perform the implementations described herein and other functions. Software application 1410 may also include an engine such as a network engine for performing various functions associated with one or more networks and network communications. The components of computing system 1400 may be implemented by one or more processors or any combination of hardware devices, as well as any combination of hardware, software, firmware, etc.

Computing system 1400 also includes an inertial measurement unit 1412. Inertial measurement unit 1412 is an electromechanical device that measures acceleration forces. Such forces may be static, such as the constant force of gravity pulling at inertial measurement unit 1412. Such forces may be dynamic, caused by moving or vibrating the accelerometer. As indicated above, inertial measurement unit 1412 may be used to detect the direction of gravity, which may be used to determine the motion of a camera.

For ease of illustration, FIG. 14 shows one block for each of processor 1402, operating system 1404, memory 1406, I/O interface 1408, and software application 1410. These blocks 1402, 1404, 1406, 1408, and 1410 may represent multiple processors, operating systems, memories, I/O interfaces, and software applications. In various implementations, computing system 1400 may not have all of the components shown and/or may have other elements including other types of components instead of, or in addition to, those shown herein.

In various implementations, computing system 1400 includes logic encoded in one or more non-transitory computer-readable storage media for execution by the one or more processors. When executed, the logic is operable to perform operations associated with implementations described herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A method for providing Augmented Reality (AR) content, the method comprising:
   receiving images of a physical scene captured by a camera of a device;
   processing the images in a pipeline to generate AR images, wherein each image is processed by a graphics processing unit (GPU) before being processed by a central processing unit (CPU) while the GPU is processing a subsequent image, the processing of each image including:
      computing, by the GPU, feature points of the image from one or more real-world objects in the physical scene;
      transmitting the feature points from the GPU to the CPU;
      determining, by the CPU, changes in a position and an orientation of the camera using the feature points;
      transmitting the changes in the position and the orientation of the camera from the CPU to the GPU;
      overlaying, by the GPU, virtual content onto the physical scene depicted in the image using the changes in the position and the orientation of the camera, resulting in an AR image, following computing, by the GPU, the features points of the subsequent image with a timestamp subsequent to a timestamp of the image; and
      generating, by the GPU, one or more buffer frames based on the image and by interpolating feature points from at least one other processed image; and
   providing the AR images and the buffer frames to be displayed, wherein the buffer frames are interlaced between the AR images.

2. The method of claim 1, wherein the processing is performed based on a web application, and wherein the web application is based at least in part on C++ code that is revised to optimize performance of generated JavaScript.

3. The method of claim 1, wherein the processing is performed using a predetermined subset of JavaScript transpiled or compiled from source code of another programming language.

4. The method of claim 1, further comprising switching between different computation pipelines based on one or more of device characteristics or runtime performance evaluation.

5. The method of claim 1, wherein the feature points are extracted using a shader executing on the GPU.

6. The method of claim 1, wherein the AR images are provided to a browser executing on the device for display within the browser.

7. The method of claim 1, further comprising performing multithread execution of JavaScript.

8. The method of claim 7, wherein performing the multithread execution comprises:
   executing, by the CPU, a first JavaScript operation in a main thread;
   executing, by the CPU, one or more second JavaScript operations in one or more background threads, wherein the main thread and the one or more background threads are performed asynchronously.

9. The method of claim 1, further comprising:
accessing from the device one or more of sensor data, camera image data, or inertial measurements using web frameworks; and
rendering the AR images based on at least one of the sensor data, the camera image data, or the inertial measurements.

10. The method of claim 1, further comprising:
obtaining camera data from a device library;
parsing the camera data; and
determining one or more intrinsic parameters of the camera from the camera data, wherein the one or more intrinsic parameters include at least one of a field of view, a principal point, or distortion parameters.

11. A non-transitory computer-readable medium comprising instructions for providing Augmented Reality (AR) content, the instructions, when executed by a computing system, causing the computing system to perform operations including:
receiving images of a physical scene captured by a camera of a device;
processing the images in a pipeline to generate AR images, wherein each image is processed by a graphics processing unit (GPU) before being processed by a central processing unit (CPU) while the GPU is processing a subsequent image, the processing of each image including:
computing, by the GPU, feature points of the image from one or more real-world objects in the physical scene;
transmitting the feature points from the GPU to the CPU;
determining, by the CPU, changes in a position and an orientation of the camera using the feature points;
transmitting the changes in the position and the orientation of the camera from the CPU to the GPU;
overlaying, by the GPU, virtual content onto the physical scene depicted in the image using the changes in the position and the orientation of the camera, resulting in an AR image, following computing, by the GPU, the features points of the subsequent image with a timestamp subsequent to a timestamp of the image; and
generating, by the GPU, one or more buffer frames based on the image and by interpolating feature points from at least one other processed image; and
providing the AR images to be displayed and the buffer frames to be displayed, wherein the buffer frames are interlaced between the AR images.

12. The non-transitory computer-readable medium of claim 11, wherein the processing is performed based on a web application, and wherein the web application is based at least in part on C++ code that is revised to optimize performance of generated JavaScript.

13. The non-transitory computer-readable medium of claim 11, wherein the processing is performed using a predetermined subset of JavaScript transpiled or compiled from source code of another programming language.

14. The non-transitory computer-readable medium of claim 11, wherein the operations further comprise switching between different computation pipelines based on one or more of device characteristics or runtime performance evaluation.

15. The non-transitory computer-readable medium of claim 11, wherein the feature points are extracted using a shader executing on the GPU.

16. The non-transitory computer-readable medium of claim 11, wherein the AR images are provided to a browser executing on the device for display within the browser.

17. The non-transitory computer-readable medium of claim 11, wherein the operations further comprise performing multithread execution of JavaScript.

18. The non-transitory computer-readable medium of claim 17, wherein performing the multithread execution comprises:
executing, by the CPU, a first JavaScript operation in a main thread;
executing, by the CPU, one or more second JavaScript operations in one or more background threads, wherein the main thread and the one or more background threads are performed asynchronously.

19. The non-transitory computer-readable medium of claim 11, wherein the operations further comprise:
accessing from the device one or more of sensor data, camera image data, or inertial measurements using web frameworks; and
rendering the AR images based on at least one of the sensor data, the camera image data, or the inertial measurements.

20. The non-transitory computer-readable medium of claim 11, wherein the operations further comprise:
obtaining camera data from a device library;
parsing the camera data; and
determining one or more intrinsic parameters of the camera from the camera data, wherein the one or more intrinsic parameters include at least one of a field of view, a principal point, or distortion parameters.

* * * * *